United States Patent [19]
Renk et al.

[11] 3,905,659
[45] Sept. 16, 1975

[54] LUBRICATED BEARING

[75] Inventors: Richard J. Renk; George E. Boller, both of Winona, Minn.

[73] Assignee: Gladys D. Miller, Winona, Minn.

[22] Filed: Apr. 16, 1973

[21] Appl. No.: 351,176

[52] U.S. Cl. .............................. 308/36.1; 308/132
[51] Int. Cl. ....... F16c 1/24; F16c 33/78; F16j 15/34
[58] Field of Search ........................... 308/36.1, 132

[56] References Cited
UNITED STATES PATENTS

| | | | |
|---|---|---|---|
| 1,437,560 | 12/1922 | Shearer | 308/132 |
| 1,621,709 | 3/1927 | Brown | 308/36.4 |
| 1,621,751 | 3/1927 | Pruger | 308/36.4 |
| 2,066,931 | 1/1937 | Else | 308/36.4 |
| 2,827,343 | 3/1958 | Cox | 308/132 |
| 2,980,472 | 4/1961 | Harkenrider | 308/132 |
| 3,210,138 | 10/1965 | Boller et al. | 308/132 |
| 3,254,925 | 6/1966 | Cox | 308/36.1 |
| 3,827,769 | 8/1974 | Boller et al. | 308/132 |

Primary Examiner—M. Henson Wood, Jr.
Assistant Examiner—Howard Beltran
Attorney, Agent, or Firm—Richard J. Renk

[57] ABSTRACT

A bearing and assembly for providing reduced lubricant losses wherein the bearing has a groove therein and a drain in the bearing communicates with the groove to allow lubricant to be moved away from the groove to the drain by rotation of a member carried by a journal.

18 Claims, 14 Drawing Figures

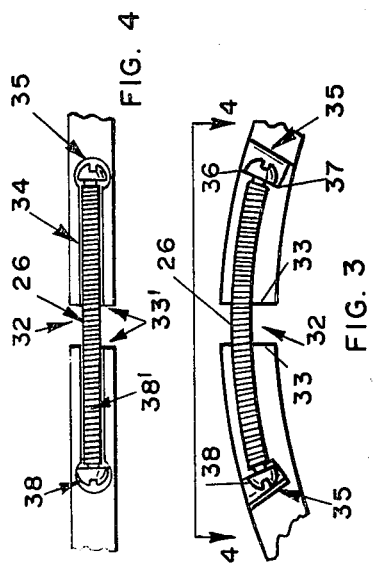
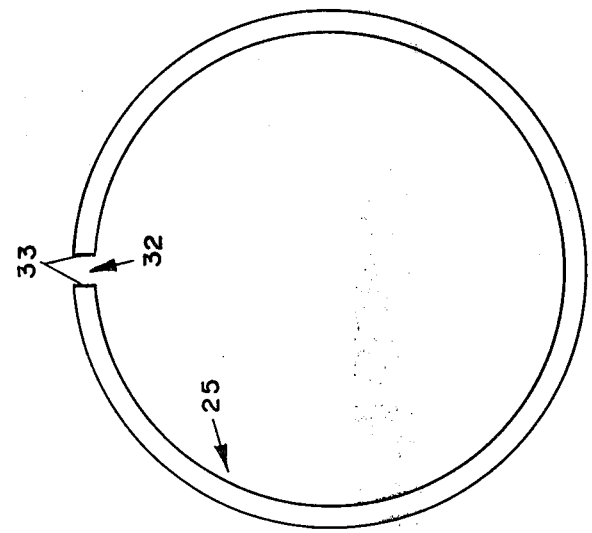
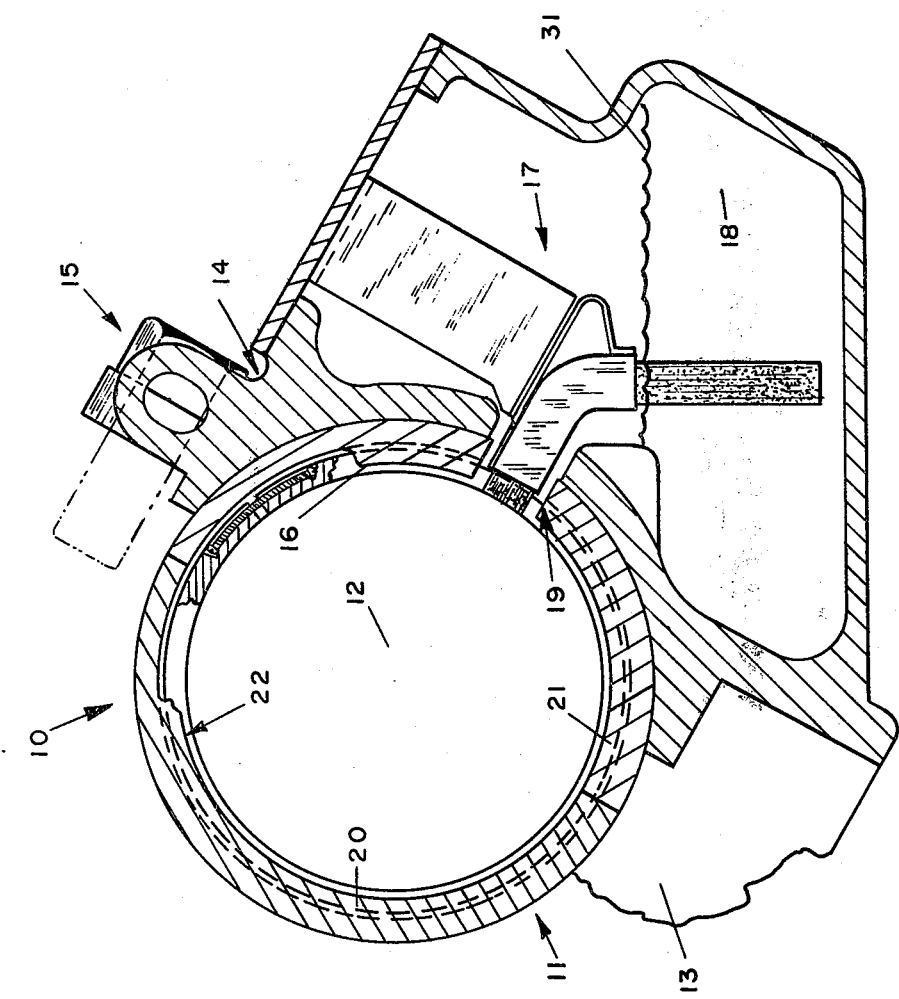

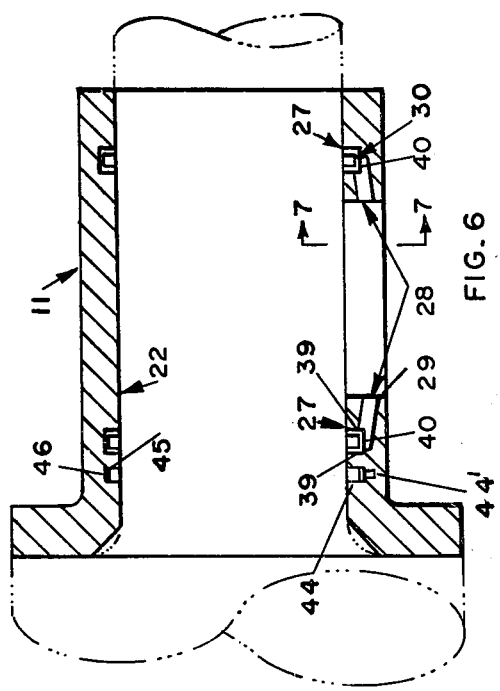
FIG. 6
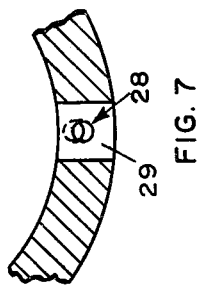
FIG. 7
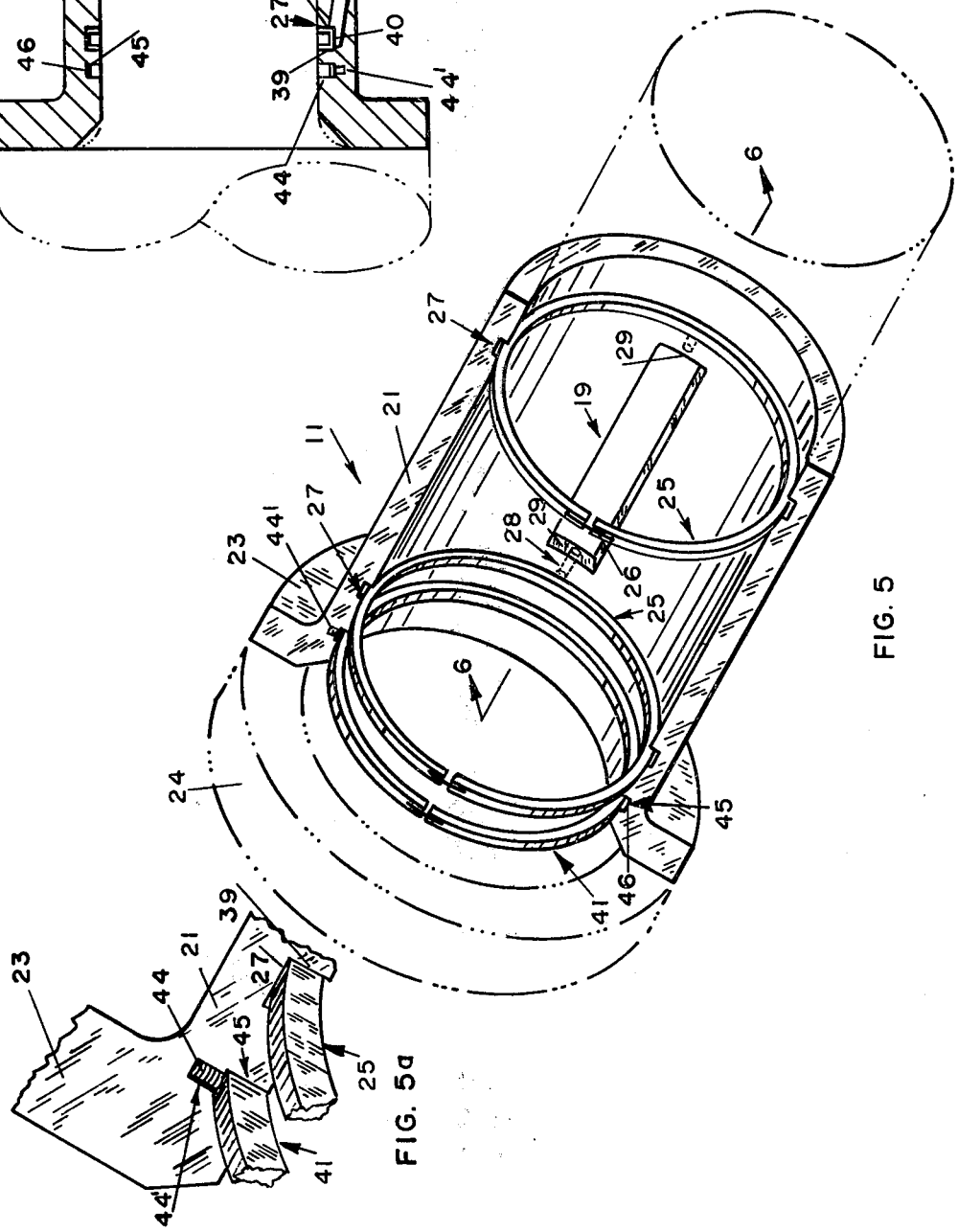
FIG. 5
FIG. 5a

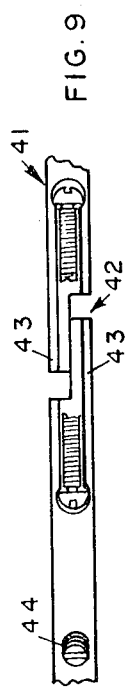
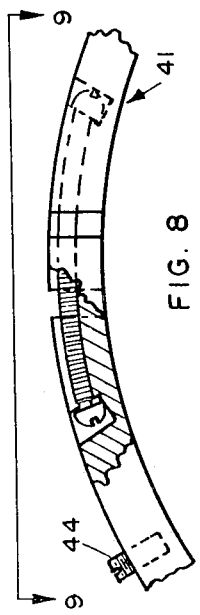
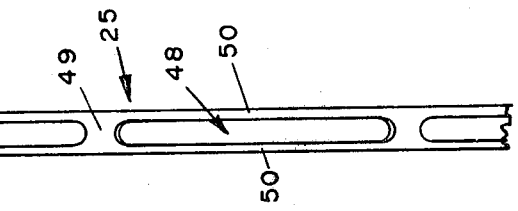
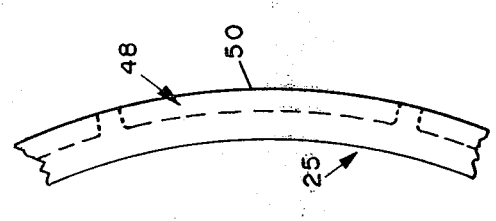
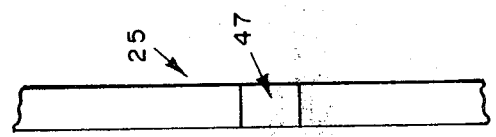
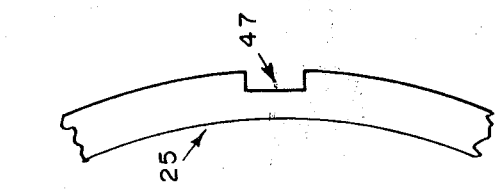

LUBRICATED BEARING

BACKGROUND OF INVENTION

The present invention relates to traction motor support bearing lubrication such as may be found in diesel and electric locomotives and as generally described in U.S. Pat. Nos. 2,980,472 and 3,254,925.

Suspension bearings of this type are used to support part of the weight of a driving electric traction motor on an axle of a locomotive. Lubrication is supplied to the suspension bearing by means of a lubricator.

Because of the critical nature of the support bearing, it is important that the supply of lubricant be conserved and that dirt and brake shoe dust be kept out of the bearing area. However, up to this time, this has been difficult to accomplish because of the many variables involved such as cocking of the suspension bearings (and traction motor) relative to the axle because of gear reaction forces, because of lateral movement between the suspension bearings and the axle, and because of wide variances in bore clearances between the axle and the bearings.

SUMMARY OF INVENTION

The present invention provides an arrangement wherein the lubricant is restricted in its flow outwardly of the suspension bearing and is returned to the lubricant reservoir. This is accomplished by the use of a member such as a ring or series of rings which engage a circular surface and are nested in a groove(s) in the support bearing and are free to accomodate the cocking, lateral and clearance variables.

DESCRIPTION OF DRAWINGS

FIG. 1 is a fragmentary vertical section through a traction motor suspension bearing, axle cap and lubricator, showing a ring member partially exposed.

FIG. 2 is a side view of a ring member.

FIG. 3 is a fragmentary side view of the ring of FIG. 2 showing a means of biasing the free ends thereof toward one another.

FIG. 4 is a view taken generally along lines 4—4 of FIG. 3 showing the biasing means as viewed along the outer periphery of the ring.

FIG. 5 is a perspective view showing one half of a split suspension bearing with one arrangement of the oil ring members in position relative to a phantom axle.

FIG. 5a is an exploded view of a small portion of FIG. 5 showing the bearing and ring members.

FIG. 6 is a sectional view of the bearing half of FIG. 5 taken through the window along lines 6—6.

FIG. 7 is a view of the oil drain passage into the window as viewed along lines 7—7 of FIG. 6.

FIG. 8 is a fragmentary side view of a static ring member showing a means of preventing rotation.

FIG. 9 is a view taken along lines 9—9 of FIG. 8 showing the outer periphery of the split joint of the embodiment of FIG. 8.

FIGS. 10 and 11 are views of another embodiment of a rotating ring member showing notches or cogs in the outer periphery.

FIGS. 12 and 13 are views of another embodiment of a rotating ring member showing pockets in the outer periphery.

PREFERRED EMBODIMENTS

In the drawings, numberal 10 generally indicates a typical traction motor suspension bearing assembly. The assembly includes a split bearing liner or shell 11 which surrounds an axle or shaft 12. Bearing 11 is held in position against the axle 12 by a portion of the traction motor casting 13 and by an axle cap 14 through bolts 15.

Oil is applied to the journal portion 16 of the axle 12 by a lubricator 17 which serves to lift oil from the axle cap reservoir 18 and apply it to the journal through a generally rectangular window opening 19 extending through the axle cap 14 and bearing 11. The window opens or faces downwardly about 30° from the horizontal.

The bearing 11 is of the sleeve type and formed of two complimentary halves or segments 20 and 21, the latter having the window 19 (FIG. 1). The two halves have a common axial bearing surface or bore 22 which bears against the journal. A thrust flange 23 of the bearing (FIGS. 5 and 6) is adapted to engage either a wheel or gear hub indicated by phantom lines at 24.

Because of the variables of traction motor lateral, axle movement, bore clearances, and axle and bearing misalignment, lubricant retention within the suspension bearing assembly has been very difficult.

In service, oil which is applied to the journal 16 by the lubricator 17 is eventually squeezed axially outwardly toward both ends of the bearing and is lost. To reduce the oil losses, the present invention provides a novel member 25 (FIGS. 2 and 5) which returns oil to the reservoir 18 after it reaches a predetermined position in the bearing bore where it no longer serves to lubricate the bearing load zone.

As shown in FIGS. 3 to 5, the member 25, which may be in the form of a ring, is held on the journal by the clamping effect developed by a retaining or biasing member such as a coiled tension spring 26. The ring 25 thus rotates with the journal in a recessed groove 27 formed in the bearing 11. To permit rotation, the groove 27 is larger than the ring 25 in both the axial and outer peripheral dimensions.

Oil which works outwardly into groove 27 is carried or moved by the ring 25 and deposited in a drain passage 28 (FIGS. 5–7). This includes oil which collects in the bottom-most part of the groove as well as that which is running into the groove. The passage 28 extends from a generally vertically disposed side 29 of the bearing window 19 and intersects the ring groove 27 as at 30 (FIG. 6). The oil then drains through the window drain passage 28 and into the reservoir 18 wherein the maximum oil level 31 (FIG. 1) is below the window 19. To aid the flow of oil downwardly, the passage 28 may have a taper or pitch with a vertical component as shown in FIG. 6.

As shown in FIGS. 2–5, the rotating ring 25 may have a rectangular cross section and be split to provide a gap 32 to allow for thermal expansion and contraction. At the ends, the tips 33 of the ring are cut straight. Cut into the outer peiphery or O.D. of the ring on both sides of the gap 32 is channel type slot 34 (FIGS. 3 and 4). The slot breaks out of the tips 33 as at 33' and terminates at a point spaced away from the ends in a wider flared opening 35.

Openings 35 are preferably tapered at an angle to the slot and toward one another as they progress downwardly toward the center rotational axis of the ring. The tapered effect provides an undercut (FIG. 3) with the top of the side wall 36 overhanging the bottom portion 37. This provides a locking effect for the spring ends 38 which are wider than the spring body 38' and helps retain the spring ends in position when subjected to centrifical forces during rotation. The spring ends 38 may be formed with an externally attached head or, the ends may be flared during manufacture. Preferably the slot 34 and wider openings 35 at the end are deep enough to allow the spring or other biasing member 26 to be recessed or below the surface of the ring.

In a typical installation, a rotating ring member 25 can be positioned on each side of the window 19 as shown in FIG. 5. However, in some installations where an excess of oil might be desired at the bearing flange 23, only one ring might be used toward the opposite or inboard end of the bearing.

A very successful ring has been one which has a generally rectangular cross section and made of a flexible, semi-rigid material such as nylon. This allows the ring to be deformed and sprung as it is inserted around a journal by threading one end of the ring into the bearing groove 27 when one half of the bearing is in place around the journal. After the seals are in position, the other half of the bearing is then clamped into position.

In most applications the traction motor is designed to allow for lateral movement between the axle 12 and the two bearings 11 (which are fixedly secured to the motor). Lateral movement is generally between 1/16 inch to 5/16 inch. To accomodate such movement and to keep any sliding or rubbing action of the rotating ring 25 against the journal or against the sidewalls 39 (FIG. 6) of the bearing groove 27 to a minimum, the groove 27 may be formed wider (in an axial direction) than the ring 25. In other words, if the axial width of the ring is ¼inch, the width of the groove may be 9/16 inch etc. In a radial direction, a very satisfactory ring thickness has been ¼inch.

The ring 25 thus continues to rotate with the journal with no contact with the groove 27 even though the traction motor and its attached bearings may move from side to side. However, contact of the ring 25 against the side walls 39 of the grooves 27 is easily accommodated as the ring is cammed slightly along the journal to provide a self centering action. As a further advantage, the spring 26 also allows the ring to slip on the journal if the ring 25 is restrained from moving. In other words, it provides a slip-clutch effect.

Because the clearance between the bearing bore 22 and the journal 12 can vary from .010 inch to as much as .060 inch, , sufficient minimum clearance has to be provided between the outer periphery of the ring 25 and the bottom 40 (FIG. 6) of the groove 27 so that the ring is free to rotate. Likewise, the minimum clearance also has to accommodate cocking of the traction motor due to reaction forces generated by the traction motor pinion gear and the axle bull gear (not shown). Thus, in most instances, the axle and the bearings are not in true axial alignment with one another.

It has been these variables of traction motor lateral, axle movement, bore clearances, and axle and bearing misalignment that have made lubricant retention within the suspension bearing assembly so difficult. With the concepts of the present invention, using a rotating member on each side of the window opening, oil losses have been reduced to as much as 1/16th of former losses.

Another embodiment, is shown in FIGS. 8 and 9, wherein a static ring 41 (FIG. 5) may be used to keep dirt, brake shoe dust and the like out and aid in keeping oil in. The static ring 41 may employ the same spring bias 26 as the rotating ring 25. Instead of a butt joint, the static ring may employ an over-lapping joint 42 (FIG. 9) with over-hanging ends 43. A dowel or pin 44 extending from the outer periphery of the ring nests in a complimentary recess 44' in a bearing groove 45 to keep the static ring from rotating. The recess 44' may be formed in one half of the bearing at the split line as shown in FIG. 5(a).

The bearing groove 45 for the static ring is generally formed to fit snugly against the sides of the ring but the bottom 46 of the groove is larger than the O.D. of the ring. With the depth of the bottom of the groove being larger, the ring 41 may receed into the groove when the axle cocks or bearing wears.

Another embodiment of the rotating ring member 25 of the invention is shown in FIGS. 10 and 11 wherein notches 47 are cut at spaced intervals into the outer periphery of the rotating ring. The notches thus provide pockets in which oil collects and is moved or impelled around the grooves to the drain passage 28.

A still further embodiment of the rotating ring member 25 is shown in FIGS. 12 and 13 wherein confined pockets 48 are formed in the outer periphery of the rings. The pockets 48 are separated by lands 49 and enclosed on their sides by walls 50. The pockets collect oil to provide for greater movement to the drain passage 28.

While the drain passages 28 have been shown to be centered with respect to the vertical sides of the window 19, they can be at other locations around the bearing grooves 27 to drain the oil outwardly from the bearing body. In such case, for example a complimentary registering drain passage would be provided in the axle cap casting to allow drainage into the reservoir 18. Likewise, while a coiled tension spring has been shown, other types of springs such as clips may be used. The springs also may be inserted along the sides of the rings rather than in the outer periphery. Of course, while the oil restricting members have been shown in the form of split rings, a partial segment or lug type could be used.

What we claim is:

1. A bearing comprising,
   a arcuate bearing surface sized to engage a journal,
   a continuous groove in which a rotating member may move during rotation of a journal, and
   an internal drain passage extending within said bearing and communicating with said groove to allow a lubricant to be moved away from said groove and into said passage by said member during rotation thereof.

2. A bearing for use with a traction motor suspension assembly wherein the bearing is held in engagement with an axle by an axle cap having a lubricant reservoir and wherein lubrication means is used to move a lubricant from said reservoir to said axle, and wherein a member is carried on the axle to reduce the oil losses through said bearing, comprising,
   a bearing body of the split type including a pair of complimentary bearing segments which have an arcuate bearing surface defining an axial sleeve portion adapted to engage a surface of said axle,
   said bearing body having a recessed groove formed circumferentially in the periphery of said bearing surface into which said member extends and is rotated with said axle, and a drain passage communicating with said groove, said drain passage extending outwardly of said bearing body to allow excess lubricant which enters said groove to be moved into said drain passage by rotation of said member with said axle.

3. A bearing as claimed in claim 2 wherein said groove is wider than said member to allow said member to move axially within said bearing body.

4. A bearing as claimed in claim 2 wherein said bearing has a window opening therein positioned at an angle with respect to the vertical and horizontal through which said lubricant is applied to said axle, and wherein said drain passage extends from said groove to the opening provided by said window.

5. A bearing as claimed in claim 4 wherein said groove is positioned outwardly of said window.

6. A bearing as claimed in claim 4 wherein there is a groove positioned on opposite sides of said window.

7. A bearing as claimed in claim 4 wherein said drain passage is formed as a enclosed bore within said bearing and drains away from said groove.

8. A bearing as claimed in claim 4 wherein said drain passage extends into a vertically disposed side of said window and is centered with respect thereto.

9. A bearing as claimed in claim 2 wherein a static ring groove is disposed adjacent the groove for the rotating member carried by said journal.

10. A bearing as claimed in claim 9 wherein said static ring groove has a relief area into which stop means carried by a static ring may nest to prevent rotation of said ring.

11. An assembly comprising, a rotatable shaft, a bearing mounted in supporting relation with respect to said shaft, said bearing having an confined internal continuous recessed lubricant return groove therein extending circumferentially around the internal periphery of said bearing and opening toward said shaft, a reservoir mounted to hold a lubricant for application to said shaft, a communicating drain between said groove and said lubricant reservoir through which lubricant can move, and means carried by said shaft which extends beyond the diameter of said shaft and into said groove, said means rotating with said shaft to move lubricant in said return groove toward said communicating drain and thence to said reservoir.

12. An assembly as claimed in claim 11 wherein said communicating drain connects to said return groove at a point above the bottom-most part of said return groove.

13. An assembly as claimed in claim 11 wherein said return groove is wider than said means carried by the shaft to allow said means and shaft to move laterally with respect to said bearing.

14. An assembly as claimed in claim 11 wherein said means carried by said shaft may slip on said shaft.

15. An assembly as claimed in claim 11 wherein said bearing has a window opening therein through which said lubricant is applied to said axle, and wherein said drain passage extends from said groove to the opening provided by said window.

16. An assembly as claimed in claim 11 wherein said means encircles said shaft and is resiliently held on said shaft.

17. In combination in an assembly for traction motors, an axle, a bearing, an axle cap having a lubricant reservoir therein mounted to aid in holding said bearing in contact with said axle, both said bearing and said axle cap having window openings therein which generally register with one another and open to said reservoir, said bearing having at least two recessed circumferential grooves in the bore thereof spaced axially from one another, and a drain passage communicating between each of said grooves and said reservoir, and means carried by said axle and extending into each of said grooves to aid in moving lubricant from said grooves to the drain passages and thence to said lubricant reservoir as said means are rotated by said axle.

18. A traction motor suspension bearing assembly including, a journal, a bearing in contact with said journal, said bearing having a groove therein and a drain passage communicating with said groove, and a member extending around at least a portion of said journal, said member having means holding it on said journal during rotation of said journal such that such member extends into and rotates within said groove in said bearing to move excess lubricant from said groove into said drain passage.

* * * * *